United States Patent
Kikinis

(10) Patent No.: US 10,210,320 B2
(45) Date of Patent: Feb. 19, 2019

(54) SYSTEM AND METHOD FOR SECURE 5-D USER IDENTIFICATION

(71) Applicant: Lextron Systems, Inc., Silverdale, WA (US)

(72) Inventor: Dan Kikinis, Silverdale, WA (US)

(73) Assignee: Lextron Systems, Inc., Silverdale, WA (US)

( * ) Notice: Subject to any disclaimer, the term of this patent is extended or adjusted under 35 U.S.C. 154(b) by 0 days.

(21) Appl. No.: 15/650,881

(22) Filed: Jul. 15, 2017

(65) Prior Publication Data

US 2017/0337365 A1 Nov. 23, 2017

Related U.S. Application Data

(60) Provisional application No. 62/397,875, filed on Sep. 21, 2016.

(51) Int. Cl.
*G06K 9/00* (2006.01)
*G06F 21/32* (2013.01)
(Continued)

(52) U.S. Cl.
CPC .............. *G06F 21/32* (2013.01); *G06F 21/34* (2013.01); *G06K 9/00248* (2013.01);
(Continued)

(58) Field of Classification Search
CPC .... G06F 21/30–21/32; G06F 17/30032; G06F 17/30764; G06F 2211/10; G06F 2212/466; G06F 2212/7207; G06F 3/017; G06K 9/00006; G06K 9/00221–9/00228; G06K 9/00241–9/00315; G06K 9/00335; G06K 9/00355–9/00389; G06K 9/00577; G06K 9/00597–9/00617; G06K 9/00885–9/00892; G06K 9/00906; G06K 9/2054–9/2072; G06K 9/3216; G06K 9/4661; G06K 9/52; G06K 9/6212; G06K 9/00899; G06K 9/2018; G06K 19/07354; G06K 2009/00322–2009/00328; G06K 2009/00395; G06K 2009/0059; G06K 2209/00932–2209/00939; G06K 2209/00953; G06K 2209/27; G06T 2207/30201; G06T 2207/10016–2207/10021; G06T 2207/10048; G06T 2207/30196; G06T 2207/10052; G06T 2207/30041; G06T 7/20; G06T 7/40; G06T 7/60; G06T 7/62; G06T 7/90; H04N 5/23219;
(Continued)

(56) References Cited

U.S. PATENT DOCUMENTS

| 6,845,453 | B2 * | 1/2005 | Scheidt | G06F 21/31 705/50 |
| 7,027,621 | B1 * | 4/2006 | Prokoski | G06K 9/00248 180/272 |
| 7,512,255 | B2 * | 3/2009 | Kakadiaris | G06K 9/00214 382/118 |
| 7,657,083 | B2 * | 2/2010 | Parr | G06K 9/00201 345/419 |

(Continued)

*Primary Examiner* — Jose L Couso
(74) *Attorney, Agent, or Firm* — Brian R. Galvin; Galvin Patent Law LLC

(57) ABSTRACT

A secure 5-D user identification system using 3-D facial recognition plus micro-expression recognition and head gait analysis, and method for a body-worn sensor to increase security for users and thereby decrease security circumvention for illegitimate reproduction purposes.

8 Claims, 11 Drawing Sheets

(51) Int. Cl.
*G06F 21/34* (2013.01)
*G06T 1/00* (2006.01)

(52) U.S. Cl.
CPC ..... *G06K 9/00275* (2013.01); *G06K 9/00288* (2013.01); *G06K 9/00302* (2013.01); *G06T 1/0007* (2013.01); G06K 9/00255 (2013.01); G06K 9/00315 (2013.01); G06T 2207/30201 (2013.01)

(58) Field of Classification Search
CPC ............. H04N 21/44218; H04N 21/25; H04N 21/441–21/4415; H04N 21/42201; H04N 2201/3233–2201/324; H04L 63/0861; H04L 63/10; H04L 9/32; H04L 9/3231; H04L 67/12; G06Q 20/3674; G06Q 20/388; G06Q 20/409; G06Q 20/4097; G06Q 20/40975; G06Q 20/40145; A61B 5/117; A61B 5/6821
See application file for complete search history.

(56) References Cited

U.S. PATENT DOCUMENTS

| | | | |
|---|---|---|---|
| 8,347,106 B2* | 1/2013 | Tsuria | G06F 21/32 340/5.83 |
| 9,602,483 B2* | 3/2017 | Slaby | H04L 63/08 |
| 9,665,766 B2 | 5/2017 | Musial et al. | |
| 2015/0070653 A1* | 3/2015 | Brown, Jr. | A61B 3/113 351/210 |
| 2015/0078642 A1* | 3/2015 | Fang | A61B 5/14553 382/131 |
| 2016/0001781 A1* | 1/2016 | Fung | G06F 19/345 701/36 |
| 2016/0154991 A1* | 6/2016 | Berini | G06F 21/32 382/116 |
| 2016/0294824 A1 | 10/2016 | Sezille | |
| 2016/0358011 A1* | 12/2016 | Watanabe | G06T 7/0012 |
| 2017/0053253 A1* | 2/2017 | Glaser | G06F 21/32 |
| 2017/0118207 A1 | 4/2017 | Madhu et al. | |
| 2017/0323167 A1* | 11/2017 | Mapen | G06K 9/00906 |

\* cited by examiner

SYSTEM AND METHOD FOR SECURE 5-D USER IDENTIFICATION

CROSS-REFERENCE TO RELATED APPLICATIONS

This application claims priority to U.S. provisional patent application 62/397,875, titled "SYSTEM AND METHOD FOR SECURE 5-D USER IDENTIFICATION SYSTEM AND METHOD FOR SECURE 5-D USER IDENTIFICATION", which was filed on Sep. 21, 2016, the entire specifications of each of which are incorporated herein by reference.

BACKGROUND OF THE INVENTION

Field of the Art

The disclosure relates to the field of information security, and more particularly to the field of user identification system security and prevention of circumnavigation of identification system security.

Discussion of the State of the Art

Many of the identification systems used today are easily spoofed or circumvented. For example, shortly after several phone manufacturers announced fingerprint readers, instructions appeared telling how to lift and reproduce fingerprints from phones to unlock them (example in German https://www.ccc.de/de/campaigns/aktivitaeten_biometric/fingerabdruck_kopieren). Other suggested circumvention methods include taking high resolution pictures of people waving, then processing the finger prints etc. Similarly, iris scans can be duplicated with high-resolution images reproduced on suitable equipment.

What is clearly needed is an identification system and method wherein, at very small cost for the legitimate users, high security is generated, but illegitimate reproduction costs are prohibitive.

SUMMARY OF THE INVENTION

Accordingly, the inventor has conceived and reduced to practice, a system and method for secure 5-D user identification.

The system and method disclosed herein consists in some aspects of a body-worn sensor, either on a strap, such as a wrist or ankle strap, or an arm implant, using near-field communication (NFC) or similar to communicate with the base system, and a unit with a camera viewing the face. That unit may be part of a head-worn display, such as glasses with heads up display, or a watch with a camera that can view the face when the user looks at the display. The watch is the ideal form, as it also has the body-worn aspect all in one unit. Said body-worn sensor is in some cases also used to monitor uninterrupted control of the device by the legitimate user.

According to one aspect, a system for secure 5-D™ user identification, comprising: a computing device comprising at least a processor, a memory, and a plurality of programming instructions stored in the memory and operating on the processor, wherein the programmable instructions, when operating on the processor, cause the processor to: create a video recording of a user, wherein the user's head is recorded from a range of positions and the recording comprises segments recorded using illumination in different wavelengths, is disclosed.

BRIEF DESCRIPTION OF THE DRAWING FIGURES

The accompanying drawings illustrate several aspects and, together with the description, serve to explain the principles of the invention according to the aspects. It will be appreciated by one skilled in the art that the particular arrangements illustrated in the drawings are merely exemplary, and are not to be considered as limiting of the scope of the invention or the claims herein in any way.

DETAILED DESCRIPTION

Figure 1:
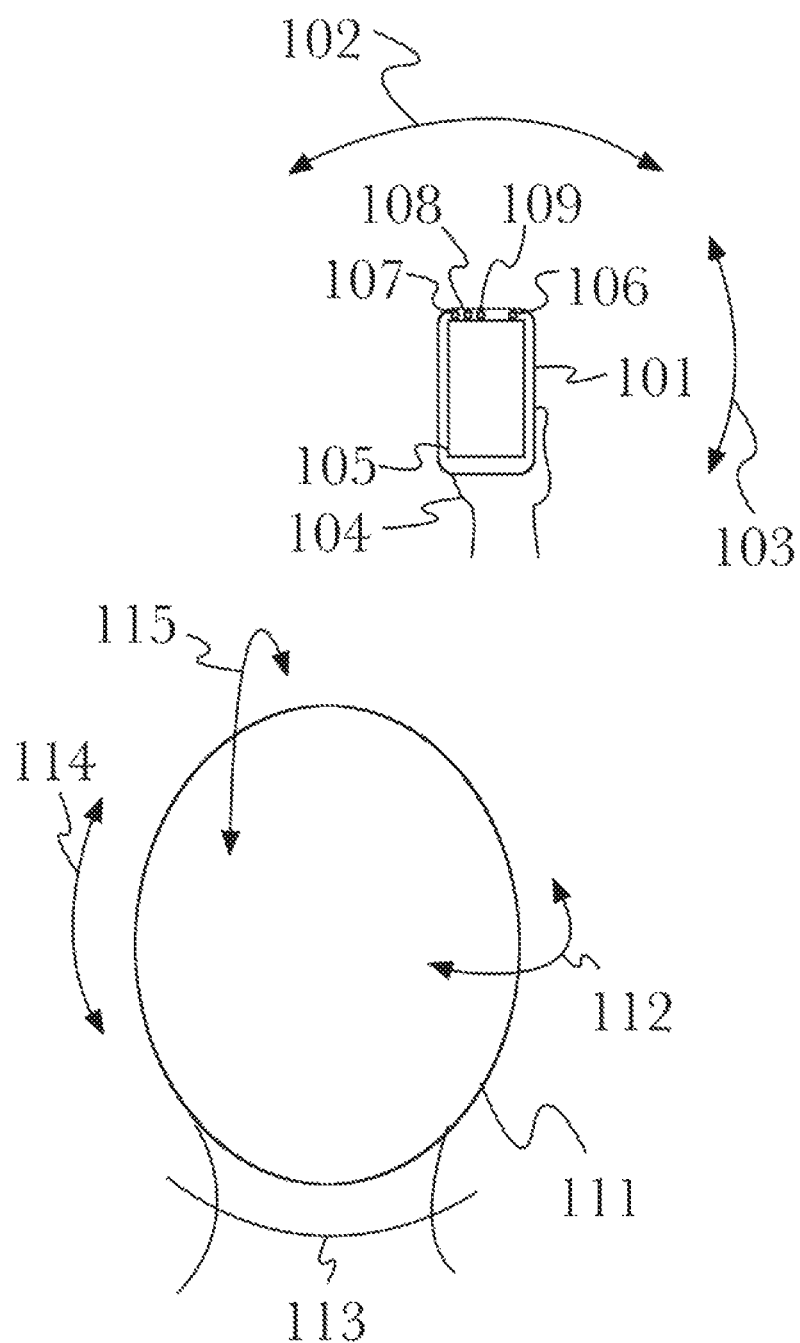
FIG. 1 is an exemplary diagram, illustrating a user's head and hand holding a mobile device, according to one aspect.

The inventor has conceived, and reduced to practice, in a preferred embodiment of the invention, a system and method for secure 5-D user identification.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Conceptual Architecture

Figure 3:
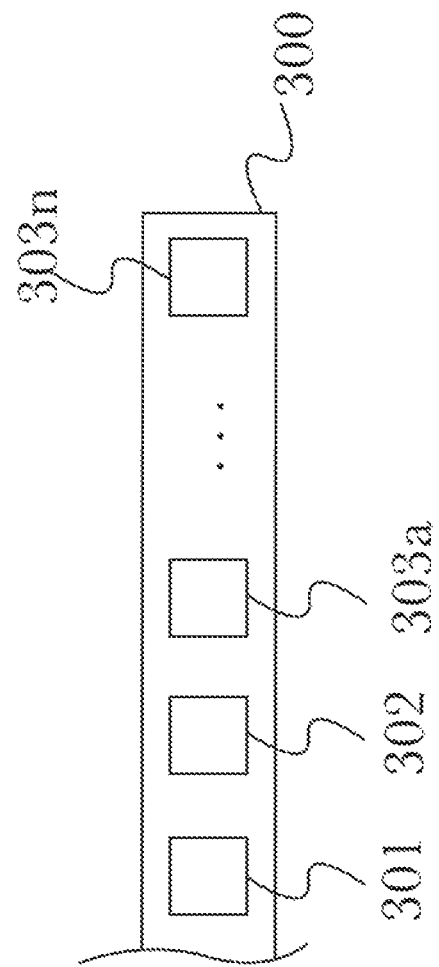
FIG. 3 is an illustration, illustrating an exemplary strip of device, according to one aspect.
Figure 8:
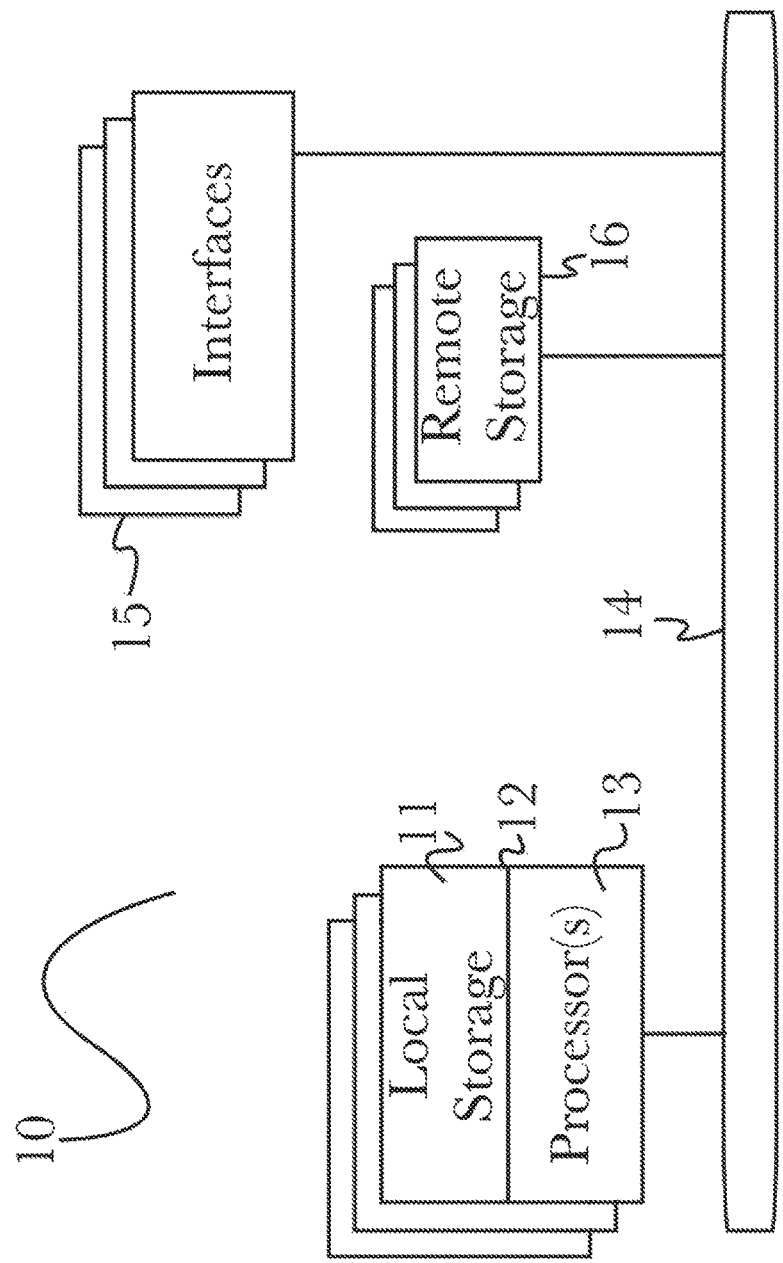
FIG. 8 is a block diagram illustrating an exemplary hardware architecture of a computing device.

FIG. 3 shows an exemplary device strip 300, according to one aspect. Strip 300 may contain, according to a particular arrangement or intended use, a camera chip 301 and a white-light light-emitting diode (LED) 302, as well as a series of near- and far-infrared LEDs 303a-n that highlight various different types of blood vessels in the face under the skin and their oxygen levels as the user breathes (due to the IR absorption and other properties of the skin, blood, and tissues). In some cases, strip 300 may be built into a host computing device such as, for example, a smartphone, tablet, electronic access panel in a door or wall, a watch etc. and may be connect to the host device's internal electronics. Strip 300 may also be configured as an add-on or accessory device that may have its own processor 12 (as shown in FIG. 8) and plug into a host device, receive instructions from the host device and operate in sync with it, either by using the host device's camera or using the strip's camera, or both together in combination. Alternately, strip 300 may have its own power source and communicate wirelessly with other computing devices, or it could plug into a tablet, smartphone, computing device, or other host device to draw power and use the physical connection for communication.

Figure 4:
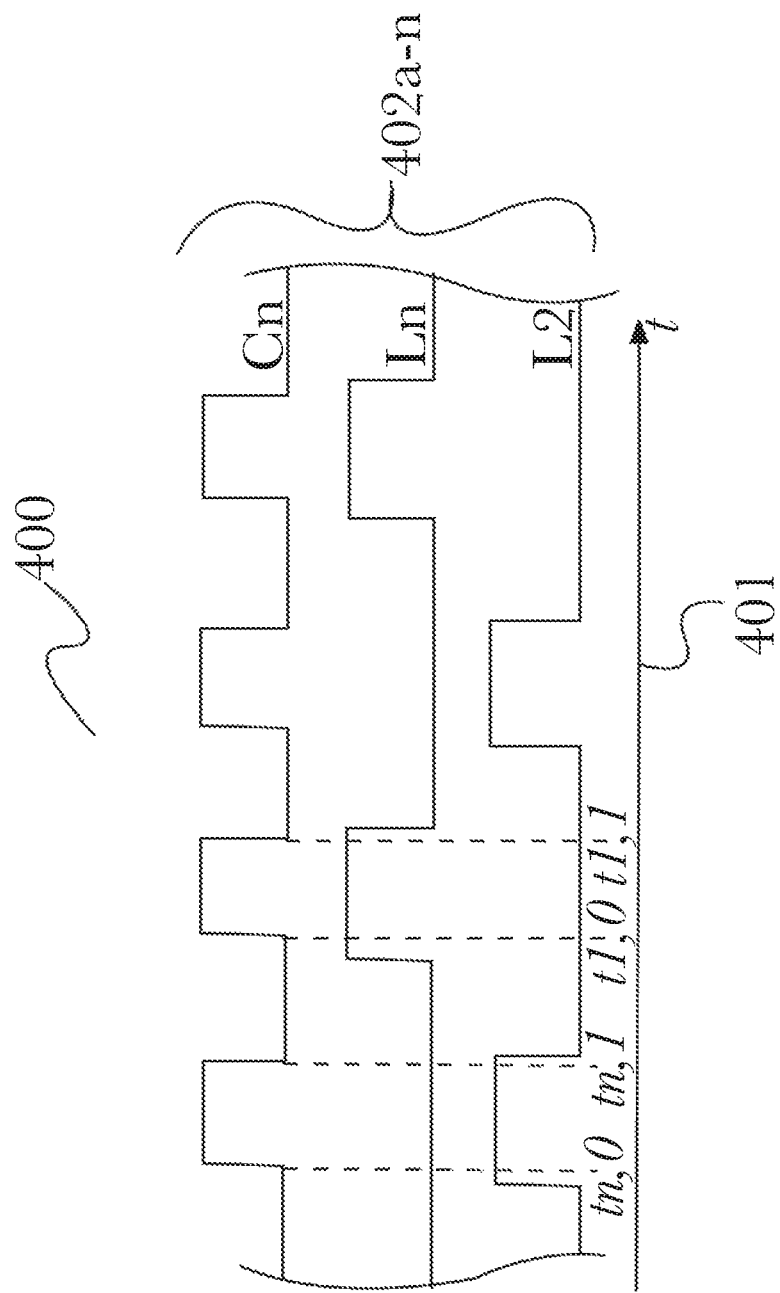
FIG. 4 is a graph diagram, illustrating interleaving of LED activity with camera activity, according to one aspect.

FIG. 4 shows a graph 400 of the interleaving of LED activity with camera activity, according to one aspect. Time activity lines 402a-n may include camera activity line C1, which shows camera activity (such as scanning or recording) occurring at regular intervals as time progresses 401. Different LED activity lines (each of which may emit a different spectrum range) such as L1, L2, etc. (only these lines are shown here for clarity and simplicity; there may be any number of additional lines as desired) can be interleaved with one another for different camera scans so the camera may detect and record different visual details based on the different wavelengths of lights that are in use. Activity line L2, for example, may be interleaved with additional LEDs (not shown) and thus expose different blood vessels with different scans. Therefore, graph 400 can be expanded accordingly to include additional LEDs for different wavelengths. Typically, a starting point may be a white light LED and 905 nm near-infrared (NIR) for human veins. Because a typical hardware camera can execute 60 scans per second over a wider range of wavelengths, in a time span of about 2 seconds, two or three graphs of vessels may be obtained easily. Graph 400 only shows a small fraction, both of time and of wavelengths, of what may be collected for the sake of clarity. White light scans may be used between NIR scans to correct for environmental factors. Also, during or between scans a user may be instructed to move the camera, for example to obtain a full 3-D view of a face, resulting in an acceptable scan from ear to ear, covering all the vessels in the face.

Figure 5:
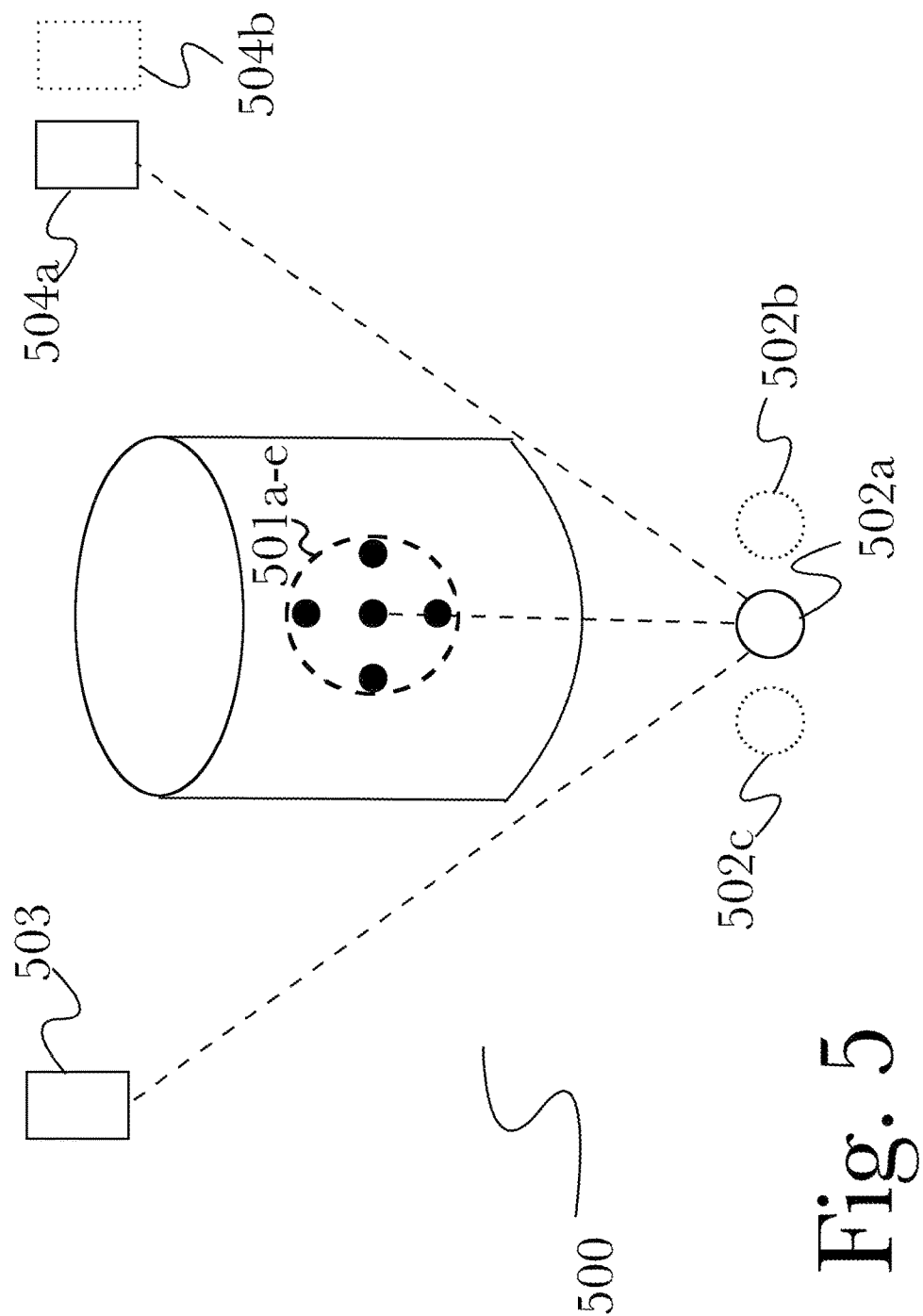
FIG. 5 is a diagram, illustrating an exemplary abstract view of a head, according to one aspect.

FIG. 5 shows a highly abstracted view of a human head 500. As the head 500 moves, a camera may see points 501a-e in various different positions, depending on scan intervals, and a point cloud scan may be adjusted accordingly. A point cloud comprises a set of data points, usually defined by X, Y, and Z coordinates in a three-dimensional coordinate system, which can be used to represent the external surface of an object. A point cloud may be created using 3-D scanning techniques, as described previously in FIG. 4. Additionally, the camera position may change, depending on the motion of the user's hand, from position 502a to 502b and 502c. To understand which part of the camera motion is the result of the motion of the head (the head gait) and which part is from the motion of the camera in the hand, the positions of background objects behind the subject may be compared. For example, one background object 503 may remain stable, while another background object 504 may appear to change positions from 504a to 504b. By comparing different background object positions to one another, the camera can deduce which motions are based on camera motion and which motions are based on head motion. Thus, these different types of motion may be separated in the point cloud analysis to accurately accommodate all motion.

Detailed Description of Exemplary Embodiments

FIG. 1 shows an exemplary diagram 100 of a user's head 111 and a hand 104 holding a mobile device 101. According to various arrangements and use cases, the device may be a smartphone 101 as shown, or it may be any of a number of alternate devices such as (for example, including but not limited to) a wrist watch as described below, or other mobile computing device. According to the aspect, the device may comprise a front-facing camera 106 and additional LEDs 107, 108, and 109. Other devices used may have more or fewer LEDs, depending on the design and functions of the particular device. Display 105 of device 101 faces the user, which display may show instructions for the user. Typically, when a person holds something, the hand experiences slight motions (it "wobbles"), as indicated by arrows 102 and 103. Also, when the person looks at something, the head experiences similar slight motions in various directions. Arrows 112, 113, 114, and 115 indicate these motions, the person's natural idle head micro-movements, or "head gait".

Facial recognition may be performed in three ways, each using 5-D™ recognition comprising 3-D facial recognition plus micro-expression recognition and head gait analysis. The micro-movements present in a person's head gait may be imperceptible to the user and even to an observer, but the muscles supporting the head are constantly at work balancing the head. Such motions are exaggerated and noticeable in a person who suffers from Parkinson's disease or similar disorder. These natural micro-movements are called a head gait, and they occur to some measurable degree in everyone.

Additionally, the system may use an active or passive implanted, skin-mounted, or near-skin sensor with near field communication (NFC) to track bio activity and affinity preservation over long periods of time. This tracking mechanism and or body-worn sensor can also be used to maintain a log of control of the user over his device at all times etc. Combined with either a PIN entry or an additional alternative protocol this system can deliver very high-security identification with very little overhead for the user. Such a system may be applicable in many different environments, such as, for example, industry networks, government, financial, medical, legal, gambling, or other fields.

In some cases, a system may use a computing device to create a video clip of a user, recording the user's head in a range of positions and motions, including the micro-movements in a user's head gait, and recording parts in different wavelengths. The system may then create a point cloud model of the user's head from the video and a 3-D mesh model of the user's head and derive a signature from the recorded motions. Likewise, the system may track the user's hand motions, including micro-movements in those cases where a computing device is hand-held, using either the video motion vs. background or accelerometers built in to determine hand motion and deriving a unique user-identifiable signature from the recorded micro-movements. Additionally, frames recorded with near infrared may be used to construct 3-D blood vessel maps, and a graph of each section of the face, including the eyes, may be derived, as well a recording of the heart rate, blood oxygen, etc. Then the system may encrypt and store securely all derived data, signatures, and other recordings. Further, the system may compare a current reading to a historical one and assess whether there is a match, to confirm or deny authenticity of the user's identification, including verification of the stored data to secure it against tampering.

Figure 2:
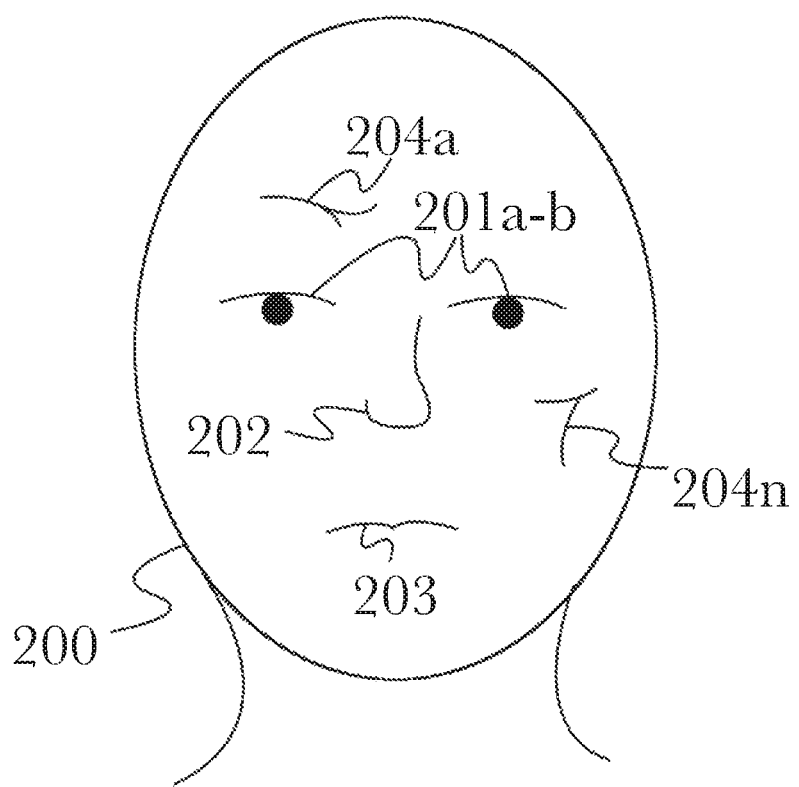
FIG. 2 is an exemplary diagram, illustrating a simplified human face with eyes, nose, mouth, and blood vessels, according to one aspect.

FIG. 2 shows a simplified exemplary diagram of a human face 200, with eyes 201a, 201b, nose 202, and mouth 203. Also shown are blood vessels 204a-n. These blood vessels can be made visible with different types of infrared light. Since the blood oxygen content of veins and arteries is not the same, these vessels have a different appearance under infrared light, and this optical variance may be used by various devices to show the location and type of particular blood vessels. For example, a phlebotomist may use a device with an infrared light emitter to determine the location of a blood vessel for a blood draw, or a nurse or doctor may likewise use such a device to locate the best vessel in which to insert an IV line.

Blood vessels in the face create a unique pattern in each individual—as unique as a fingerprint. While individual identification by fingerprint and also by the iris of the eye can be falsified, identification by facial blood vessel pattern would be virtually impossible to falsify. If a person were to (for example) put on a mask of another person's facial blood vessel patterns, an infrared identification device would immediately see that no blood is actually flowing through the vessels, as it does with each heartbeat. Also, such an additional layer would change, however slightly, the contour of the face, so that a precise 3-D recognition scan system would see that the facial contours are changed and would not register a match.

Figure 6:
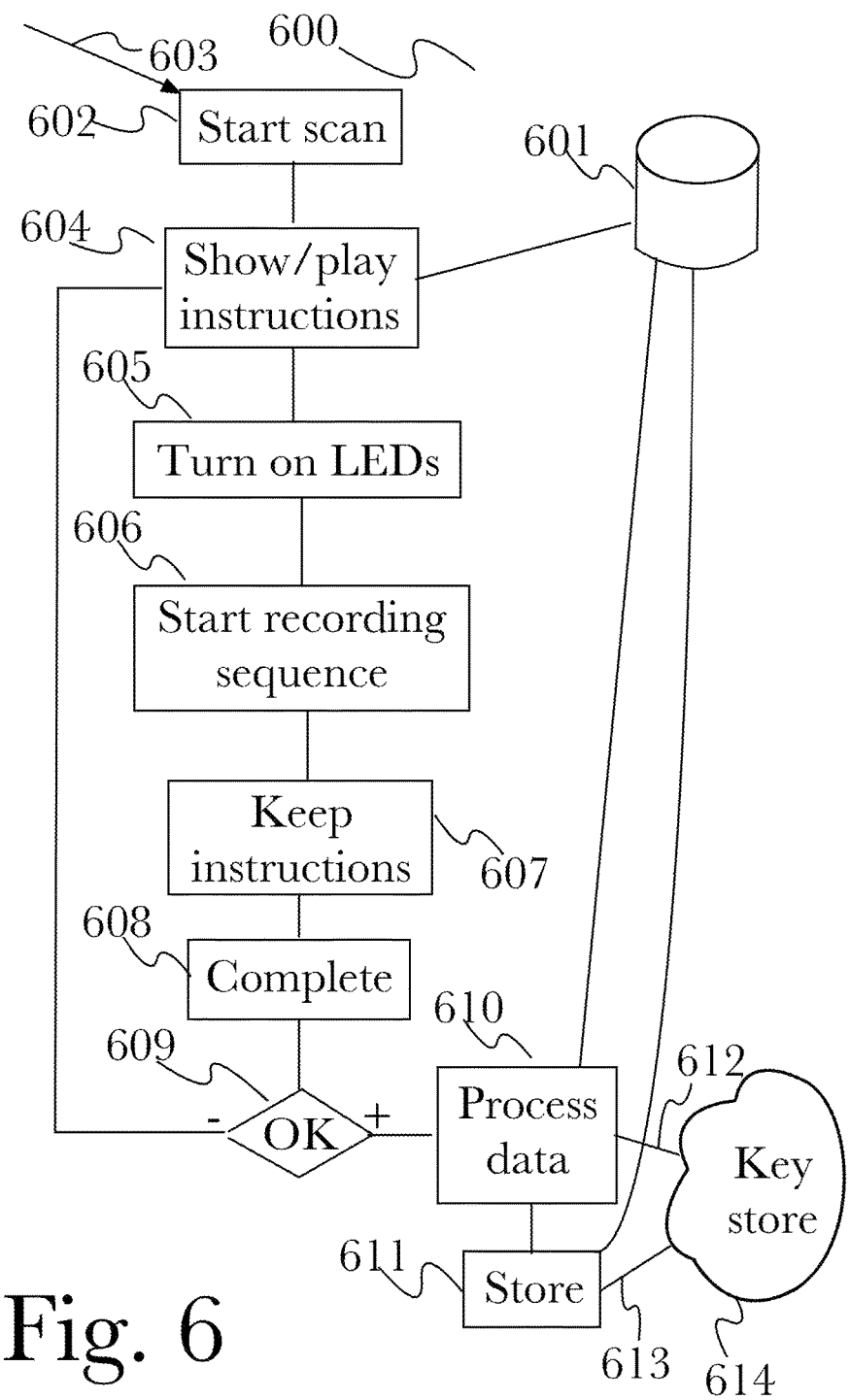
FIG. 6 is a method diagram, illustrating an exemplary process for a facial recognition scanning and analysis system, according to one aspect.

FIG. 6 shows an exemplary process 600 of a facial recognition scanning and analysis system, according to one aspect. In step 602, an external start 603 initiates the scanning process. Typically, in step 604 the system displays instructions to a user, by such means a text, video, etc. The system downloads these instructions from, typically, local storage 601. In step 605, the LEDs turn on so they can warm up and reach optimal operation temperature for correct wave lengths. Then in step 606 the recording sequence starts, while the instructions continue in step 607 to prompt the user to move the camera as needed, left to right, up and down, etc. In step 608 the recording finishes and the user is given a "recording complete" message. In step 609 the system checks to determine whether the data recording is satisfactory ("OK"). If the data is not satisfactory, the system loops back to step 604 and repeats the process. If the data is satisfactory, the system processes the data in step 610 and stores 612 the results in step 611. Keys of the activities may be stored remotely in a cloud-based key store 614 and, as additional security, in a local key store 611 (which may optionally synchronize 613 with a cloud-based store 614), so the system has a secure record of the scan and so it can authenticate identity verification.

Figure 7:
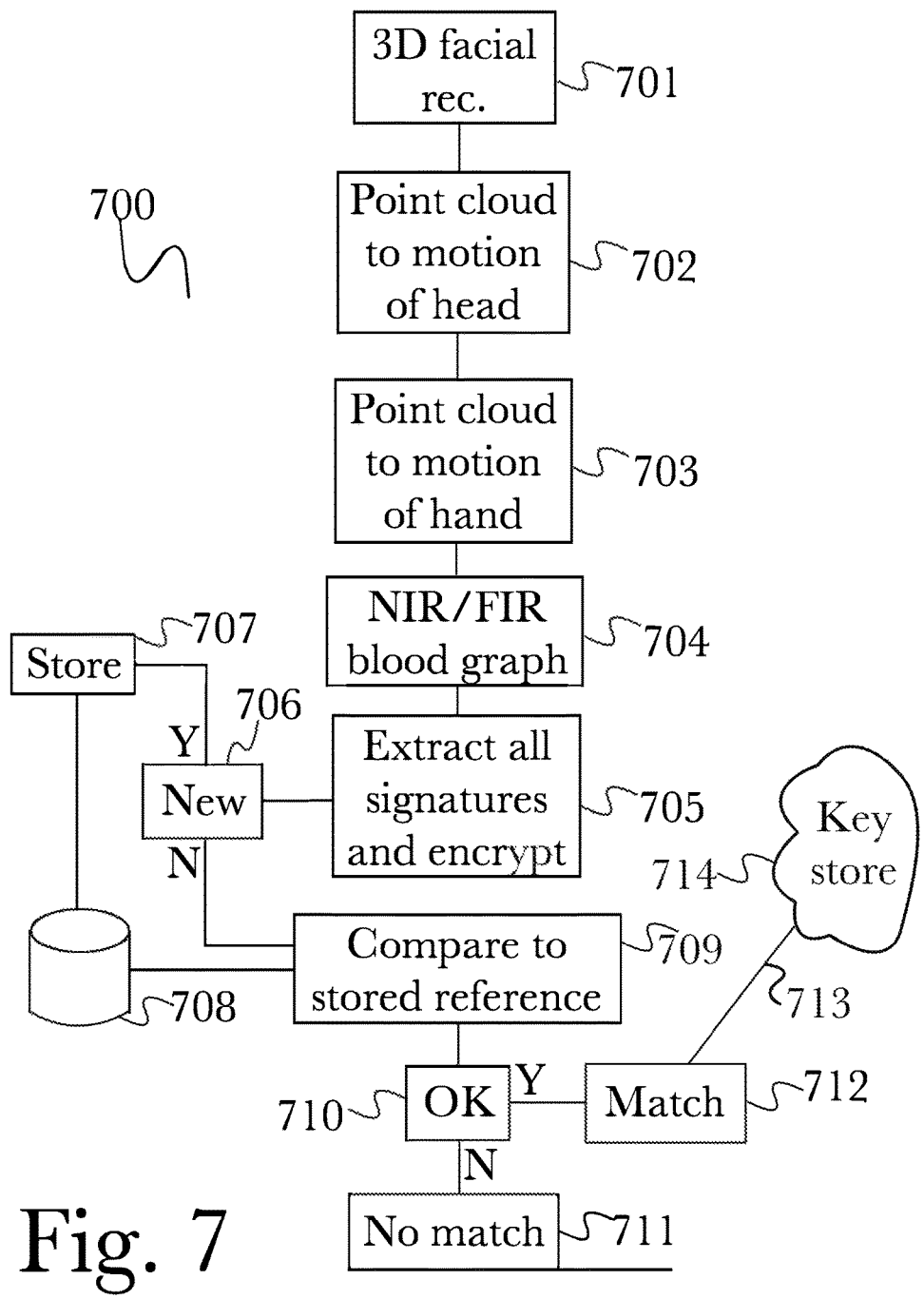
FIG. 7 is a method diagram, illustrating an exemplary process of identity verification, according to one aspect.

FIG. 7 shows an exemplary process 700 for identity verification, according to one aspect. In step 701, the system applies its 3-D facial recognition algorithms from a point-cloud-to-mesh conversion to create a 3-D recognition wire model. In step 702 the system executes point-cloud-to-motion analysis of head motion. In step 703 the system likewise executes point-cloud-to-motion analysis of hand movement. Later, typically in step 705 or similar that may be invoked several times during the processing, the system extracts those unique signatures of the user's head and hand motion. In step 704 the system analyzes the near and far infrared images of facial blood vessels to create a graph of the vessels, using techniques as described in the discussion of graph 400, above. The system also analyzes pulse data of the arteries, including realistic blood flow and heart beat in a reasonable range, to verify that the images show the face of a living person. In step 705 the system extracts, encrypts and stores all the signatures. In step 706, the system determines whether the extracted data is from an initial scan or repeat scan. If an initial scan (yes), in step 707 the data is stored in data local data store 708. If data is from a repeat scan (no), in step 709 the system compares data from this scan to reference data from previous scans of this face. In step 710, the system determines whether the current data is a match to its reference data. If the data does not match (no), the process terminates with a "no match" message in step 711. If the data matches (yes), in step 712 the system declares a "match" and approves whatever access or activity has been requested. In step 713 keys may be activated and stored in cloud 714, as described above in the discussion of FIG. 6.

The combination of the various different security layers makes the cost of an illegitimate reproduction prohibitive, as creating a rubber mask with live blood vessels can be very expensive, since it needs to fit each person. Further, such a mask would add thickness, thus distorting the 3-D facial scan, unless the person wearing it has a much smaller (while similarly-shaped) face. Further, the pulse, pulse delays between left and right side, between cheeks and eyes, etc. can be measured, and will be almost impossible to replicate reliably.

Additionally, vessels in the eyes can be incorporated in the scans, to optionally add additional complexity and protection against falsification. Further, the signatures need to allow for some changes over time, as both the size of the face, as well as the number of vessels, particularly the veins, changes over time depending on lifestyle, disease, age, general health, etc., Therefore the system needs to allow for small updates from time to time.

Various embodiments of the present disclosure may be implemented in computer hardware, firmware, software, and/or combinations thereof. Methods of the present disclosure can be implemented via a computer program instructions stored on one or more non-transitory computer-readable storage devices for execution by a processor. Likewise, various processes (or portions thereof) of the present disclosure can be performed by a processor executing computer program instructions. Embodiments of the present disclosure may be implemented via one or more computer programs that are executable on a computer system including at least one processor coupled to receive data and instructions from, and to transmit data and instructions to, a data storage system, at least one input device, and at least one output device. Each computer program can be implemented in any suitable manner, including via a high-level procedural or object-oriented programming language and/or via assembly or machine language. Systems of the present disclosure may include, by way of example, both general and special purpose microprocessors which may retrieve instructions and data to and from various types of volatile and/or non-volatile memory. Computer systems operating in conjunction with the embodiments of the present disclosure may include one or more mass storage devices for storing data files, which may include: magnetic disks, such as internal hard disks and removable disks; magneto-optical disks; and optical disks. Storage devices suitable for tangibly embodying computer program instructions and data (also called the "non-transitory computer-readable storage media") include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits) and other forms of hardware.

In some cases, a system may use a computing device to create a video clip of a user, recording the user's head in a range of positions and motions, including micro motions, and recording parts in different wavelengths. The system may then create a point cloud model of the user's head from the video and a 3-D mesh model of the user's head and derive a signature from the recorded motions. Likewise, the system may track the user's hand motions, including micro motions in those cases where a computing device is handheld, using either the video motion vs. background or accelerometers built in to determine hand motion and deriving a signature from the recorded motions. Additionally, frames recorded with near infrared may be used to construct 3-D blood vessel maps, and a graph of each section of the face, including the eyes, may be derived, as well a recording of the heart rate, blood oxygen, etc. Then the system may encrypt and store securely all derived data, signatures, and other recordings. Further, the system may compare a current reading to a historical one and assess whether there is a match, to confirm or deny authenticity of the user's identification, including verification of non-tampering with the stored data. Furthermore, in some cases, tracing or body sensors maybe used to qualify the integrity of the validation computing device.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the aspects disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific aspects, at least some of the features or functionalities of the various aspects disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some aspects, at least some of the features or functionalities of the various aspects disclosed herein may be implemented in one or more virtualized computing environments (e.g., network computing clouds, virtual machines hosted on one or more physical computing machines, or other appropriate virtual environments).

Referring now to FIG. 8, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some aspects, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a particular aspect, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 8 illustrates one specific architecture for a computing device 10 for implementing one or more of the aspects described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, a single processor 13 handles communications as well as routing computations, while in other aspects a separate dedicated communications processor may be provided. In various aspects, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the aspects described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device aspects may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 9:
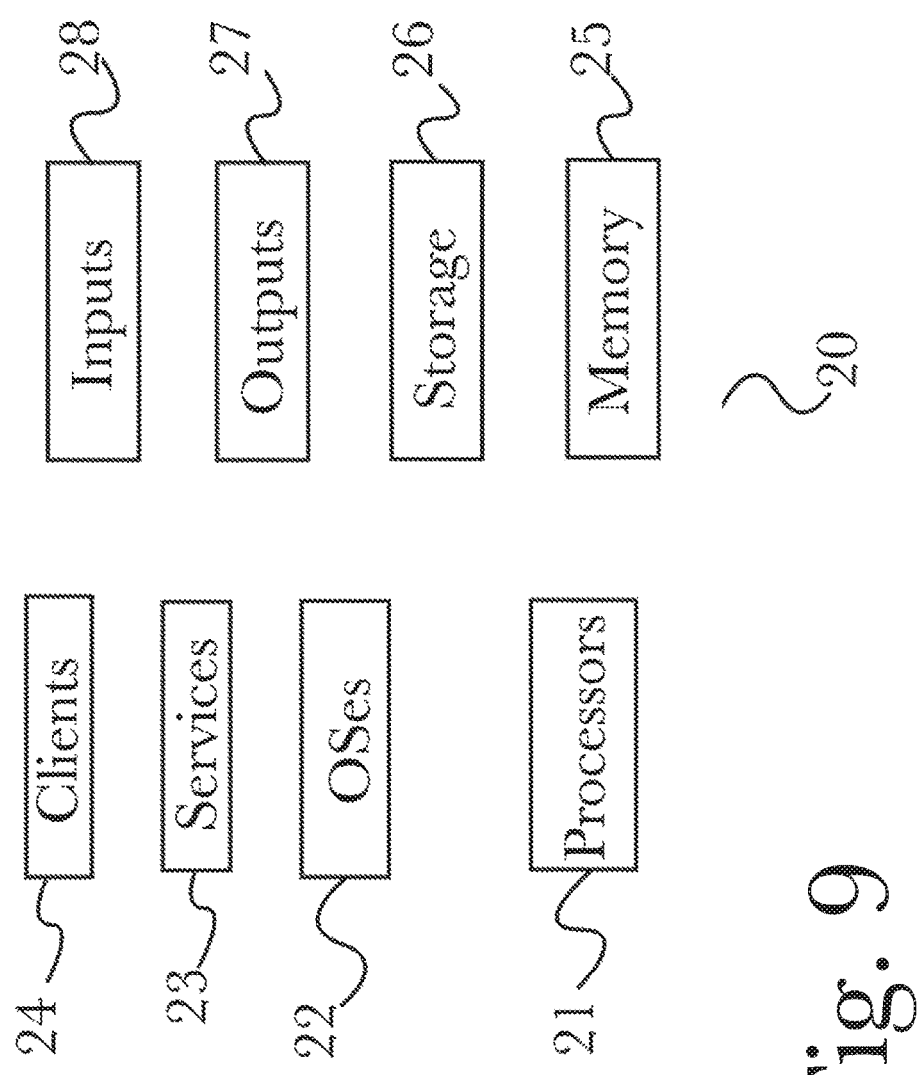
FIG. 9 is a block diagram illustrating an exemplary logical architecture for a client device.

In some aspects, systems may be implemented on a standalone computing system. Referring now to FIG. 9, there is shown a block diagram depicting a typical exemplary architecture of one or more aspects or components thereof on a standalone computing system. Computing device 20 includes processors 21 that may run software that carry out one or more functions or applications of aspects, such as for example a client application 24. Processors 21 may carry out computing instructions under control of an operating system 22 such as, for example, a version of MICROSOFT WINDOWS™ operating system, APPLE macOS™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 8). Examples of storage devices 26 include flash memory, magnetic hard drive, CD-ROM, and/or the like.

Figure 10:
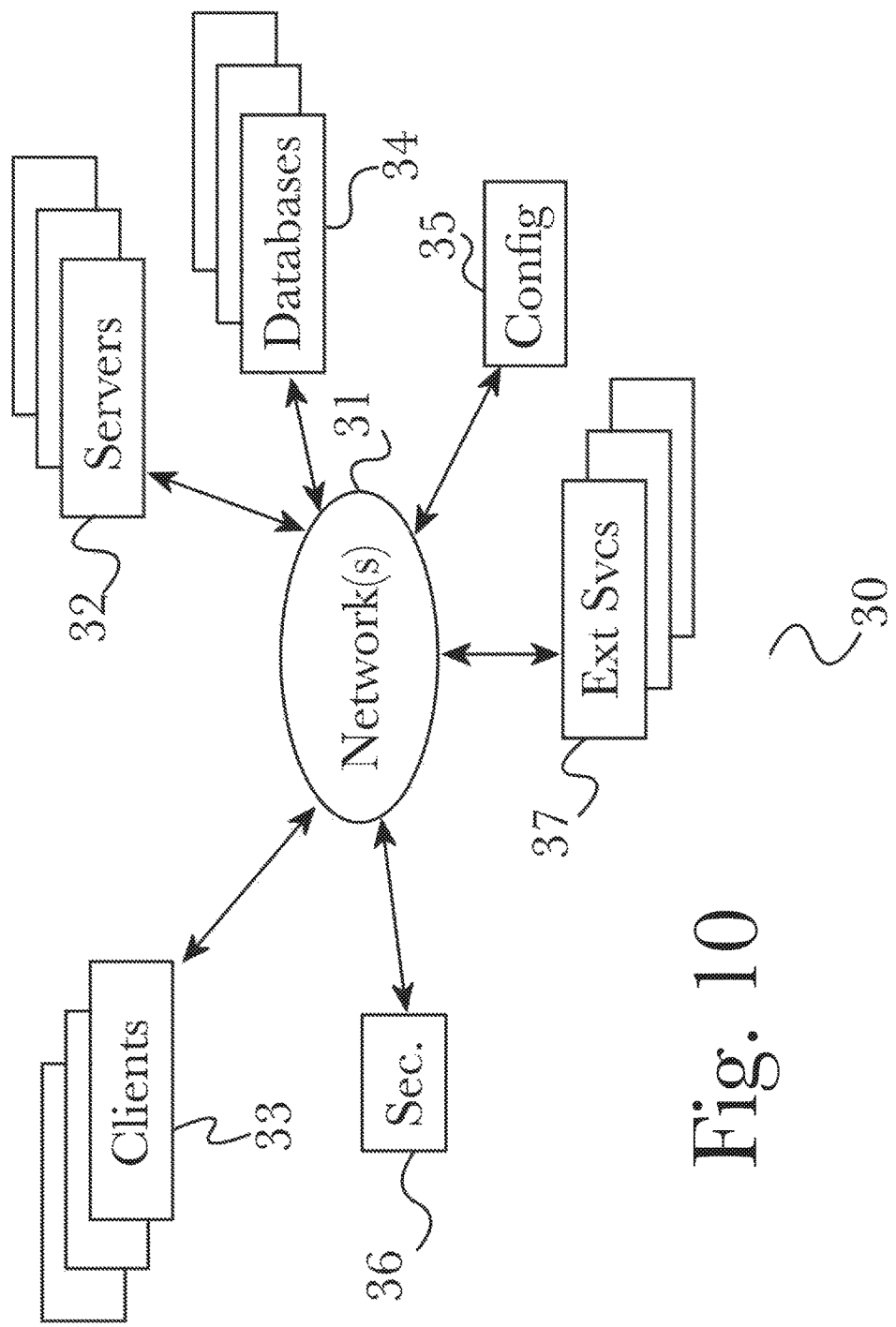
FIG. 10 is a block diagram showing an exemplary architectural arrangement of clients, servers, and external services.

In some aspects, systems may be implemented on a distributed computing network, such as one having any number of clients and/or servers. Referring now to FIG. 10, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in FIG. 9. In addition, any number of servers 32 may be provided for handling requests received from one or more clients 33. Clients 33 and servers 32 may communicate with one another via one or more electronic networks 31, which may be in various aspects any of the Internet, a wide area network, a mobile telephony network (such as CDMA or GSM cellular networks), a wireless network (such as WiFi, WiMAX, LTE, and so forth), or a local area network (or indeed any network topology known in the art; the aspect does not prefer any one network topology over any other). Networks 31 may be implemented using any known network protocols, including for example wired and/or wireless protocols.

In addition, in some aspects, servers 32 may call external services 37 when needed to obtain additional information, or to refer to additional data concerning a particular call. Communications with external services 37 may take place, for example, via one or more networks 31. In various aspects, external services 37 may comprise web-enabled services or functionality related to or installed on the hardware device itself. For example, in one aspect where client applications 24 are implemented on a smartphone or other electronic device, client applications 24 may obtain information stored in a server system 32 in the cloud or on an external service 37 deployed on one or more of a particular enterprise's or user's premises.

In some aspects, clients 33 or servers 32 (or both) may make use of one or more specialized services or appliances that may be deployed locally or remotely across one or more networks 31. For example, one or more databases 34 may be used or referred to by one or more aspects. It should be understood by one having ordinary skill in the art that databases 34 may be arranged in a wide variety of architectures and using a wide variety of data access and manipulation means. For example, in various aspects one or more databases 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some aspects, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, some aspects may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with aspects without limitation, unless a specific security 36 or configuration system 35 or approach is specifically required by the description of any specific aspect.

Figure 11:
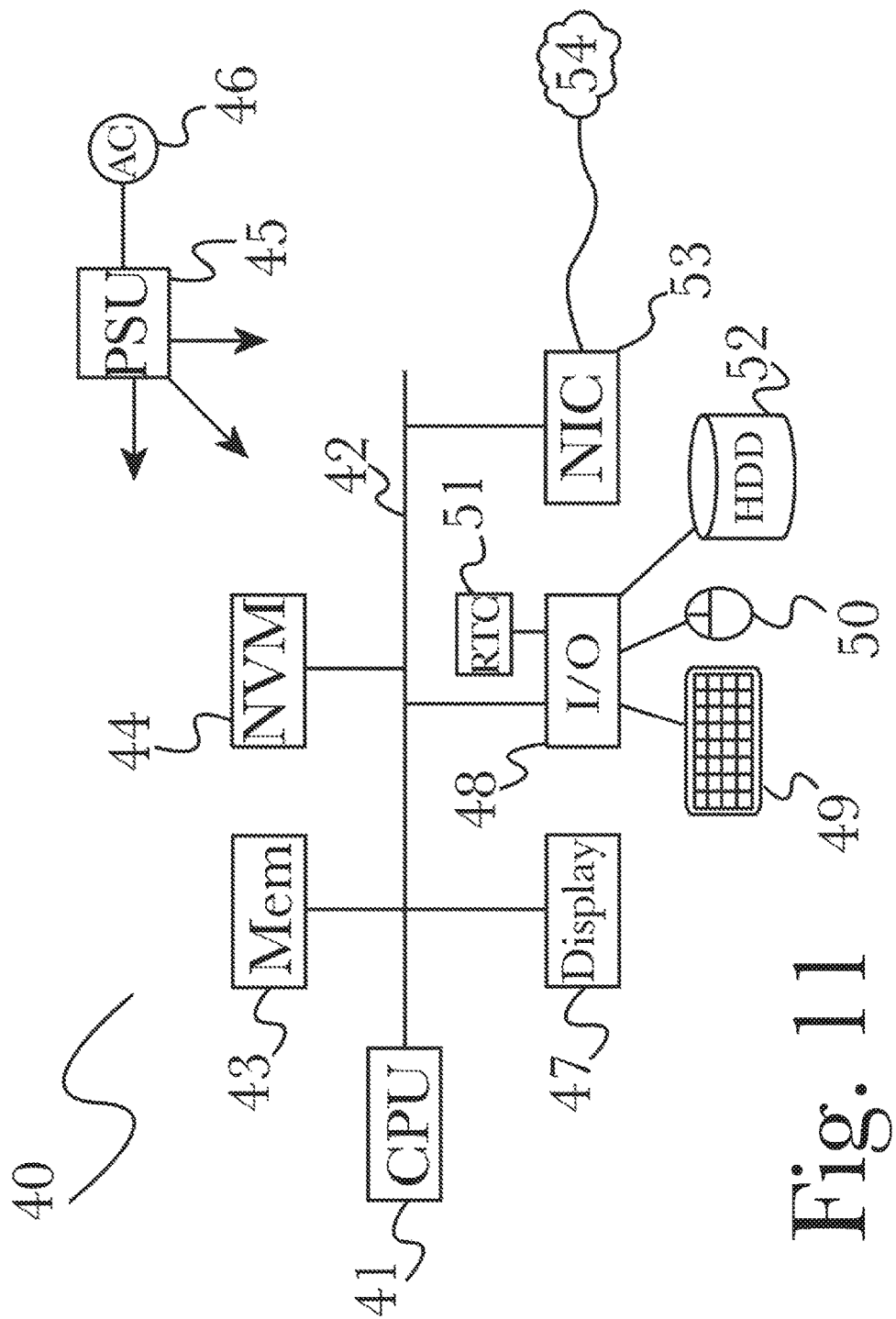
FIG. 11 is another block diagram illustrating an exemplary hardware architecture of a computing device.

FIG. 11 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to keyboard 49, pointing device 50, hard disk 52, and real-time clock 51. NIC 53 connects to network 54, which may be the Internet or a local network, which local network may or may not have connections to the Internet. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various aspects, functionality for implementing systems or methods of various aspects may be distributed among any number of client and/or server components. For example, various software modules may be implemented for performing various functions in connection with the system of any particular aspect, and such modules may be variously implemented to run on server and/or client components.

The skilled person will be aware of a range of possible modifications of the various aspects described above. Accordingly, the present invention is defined by the claims and their equivalents.

What is claimed is:

1. A system for secure five-dimensional user identification, comprising:
   a user identification device comprising at least a processor, a memory, and a plurality of programming instructions stored in the memory and operating on the processor, wherein the programmable instructions, when operating on the processor, cause the processor to:
   create a first user identification, the identification comprising:
   a video recording of a user's head, recorded from a range of positions and using illumination in different wavelengths;
   a point cloud model of the user's head, based on at least a portion of the video recording;
   a three-dimensional mesh model of the user's head, based on at least a portion of the video recording;
   a first motion signature comprising a plurality of head movements measured during the creation of the video recording, the first motion signature being uniquely identifiable to the user; and
   a second motion signature comprising a plurality of hand movements measured during the creation of the video recording, the second motion signature being uniquely identifiable to the user;
   uniquely associate the user identification with the user;
   securely store the user identification;
   record an unknown user's head from a range of positions and using illumination in different wavelengths;
   retrieve a second user identification;
   compare the second user identification against the recording of the unknown user's head and a plurality of measured movements of the unknown user's head and hand to identify the unknown user.

2. The system of claim 1, wherein the first motion signature comprises a plurality of measured micro-movements.

3. The system of claim 1, wherein the second motion signature comprises measurements collected using a plurality of non-optical hardware sensors operating on the identification device during the creation of the video recording.

4. The system of claim 1, wherein at least a portion of the video recording is recorded using near-infrared illumination, and wherein the near-infrared portion of the recording is used to construct blood vessel maps in three dimensions, and a graph of each section of the face including the eyes is derived, as well as the heart rate and blood oxygen of each section of the face.

5. The system of claim 1, wherein all derived data, signatures, and other recordings are encrypted and stored securely.

6. The system of claim 5, wherein a current reading can be compared to a historical one, and an assessment of a match can be made to confirm or deny authenticity of identification.

7. The system of claim 6, wherein the authentication includes verification of non-tampering with the stored data.

8. The system of claim 1, wherein a body-worn sensor is used to monitor uninterrupted control of the device by the legitimate user.

* * * * *